July 26, 1938.   R. H. WRIGHT   2,125,140
MOTOR STARTING CONTROL SYSTEM
Filed Jan. 29, 1937
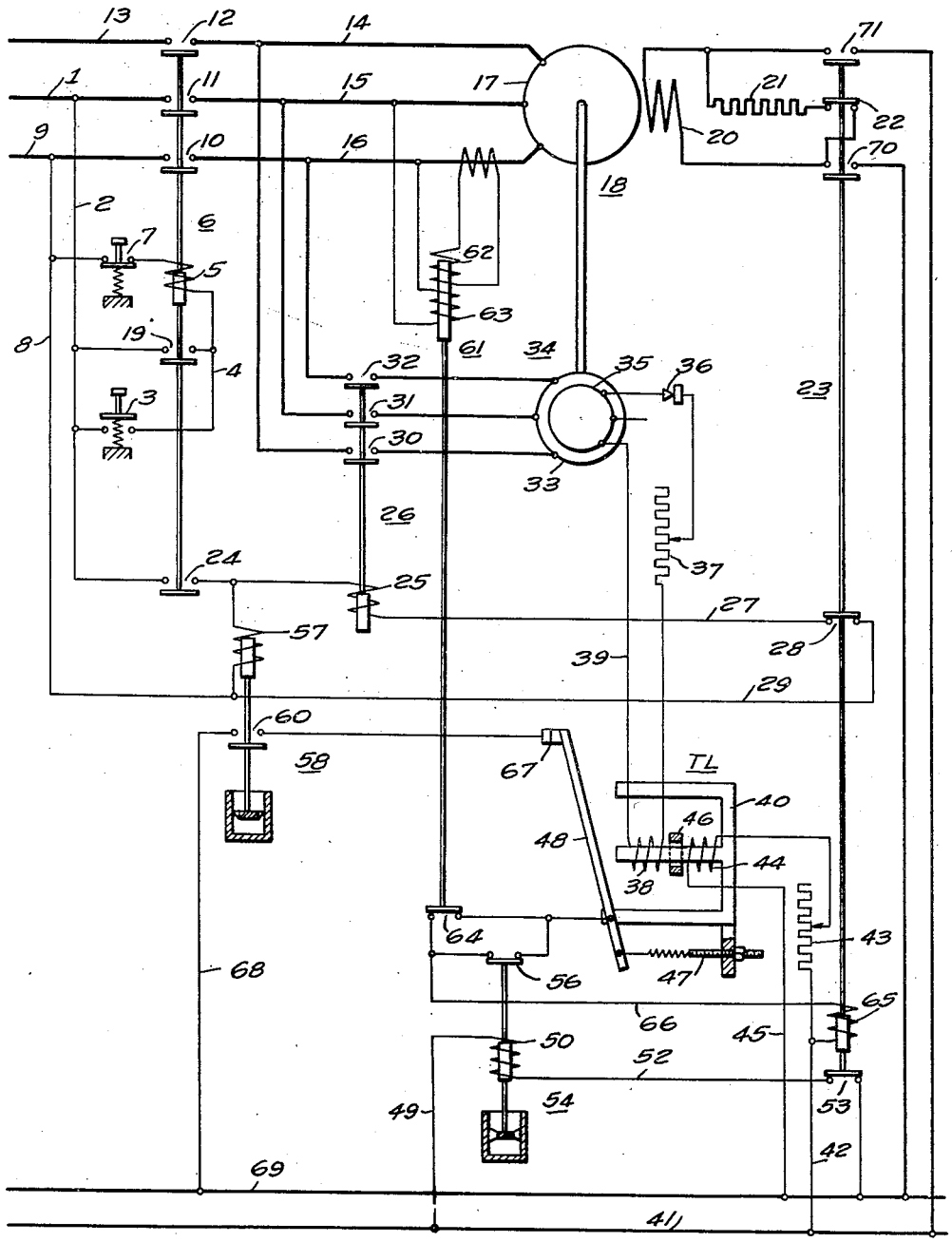
WITNESSES:
INVENTOR
Ralph H. Wright.
BY
Paul E. Friedemann
ATTORNEY Patented July 26, 1938

2,125,140

UNITED STATES PATENT OFFICE 2,125,140

MOTOR STARTING CONTROL SYSTEM

Ralph H. Wright, Swissvale, Pa., assignor to Westinghouse Electric & Manufacturing Company, East Pittsburgh, Pa., a corporation of Pennsylvania Application January 29, 1937, Serial No. 122,996

19 Claims. (Cl. 172—289)

My invention relates to control systems for controlling the starting of electric motors, that is, more particularly my invention relates to starting control systems for alternating-current electric motors.

My system of control embodies means responsive to relatively small speed variations of a motor from a given speed and the system of control is thus of special value for controlling the acceleration, synchronization, as well as the resynchronization of synchronous motors. My system of control is, however, not limited to synchronous motors but may readily be used with induction motors.

One object of my invention is to control the speed of an alternating-current motor by changing the circuit connections of the secondary winding of an alternating-current motor as a function of the speed of the motor with reference to a given speed.

A somewhat more specific object of my invention is to provide for exciting the field windings of a synchronous motor when the motor has attained substantially synchronous speed.

Another object of my invention is to provide for the transfer of a motor from starting to running connections in response to changes in speed of the motor with reference to a given speed.

Other objects and advantages will become more apparent from a study of the following specification, when taken in conjunction with the accompanying drawing, in which:

The single figure is a diagrammatic view of my invention showing a system of control for controlling the starting of an electric motor.

Referring more particularly to the figure, reference characters 1, 9 and 13 designate buses leading to some generator of an alternating-current, as the generator of a power plant, for energizing the alternating-current motors 18 and 34. The alternating-current motor 18 is of the synchronous type having an armature winding 17 and a field winding 20, whereas the alternating-current motor 34 is an induction motor of the wound rotor type having a primary winding 33 and a secondary winding 35. For my system of control the motor 34 is relatively small and is coupled to be driven by the motor 18, whether operating as an induction motor or as a synchronous motor.

The line contactor 6 is adapted to connect the buses 1, 9 and 13 to the armature winding 17 of the synchronous motor 18, whereas the field contactor 23, when suitably energized, is adapted to open the discharge circuit for the field winding 20 and adapted to connect the field winding 20 to a source of direct-current indicated by the buses 41 and 69. To prevent the premature energization of the field winding 20 with direct-current, a time limit device 58 is so disposed in the control circuit for the field contactor 23 that this contactor in no case can be energized before the lapse of a predetermined interval of time.

Contactor 26 is disposed to connect the primary winding 33 of the motor 34 to the alternating-current buses 1, 9 and 13.

A suitable time limit relay TL is interconnected with the secondary winding 35 of the motor 34 and also has a coil 44 interconnected with the source of direct-current 41 and 69. This time limit relay TL controls the time of operation of the field contactor 23. This TL relay is of the type having a definite yet adjustable time constant and includes, among other elements, a magnetizing coil 38 connected in circuit relation with the secondary winding 35 of the induction motor 34 through a rectifier 36, a neutralizing coil 44 connected to the source of direct-current, and a copper sleeve 46 acting as a short-circuited coil. This relay has armature biasing means 47 including a spring and means for adjusting the tension of the spring.

To aid in the resynchronization of the motor 18 in the event of a pull-out, I have shown a power factor relay 61 and a time limit device 54 which will be discussed more in detail hereinafter.

A better understanding of my invention can probably be had from a study of the typical starting sequence for the motor 18. Assuming that the buses 1, 9 and 13 are suitably energized with an alternating current and that buses 41 and 69 are suitably connected to some source of direct-current power and the attendant wishes to start the motor 18, he depresses the starting push button or switch 3, whereupon a circuit is established from the energized bus 1, through conductor 2, starting switch 3, conductor 4, actuating coil 5 of the line contactor 6, stop push button switch 7 and conductor 8 to the bus 9. Energization of the actuating coil 5 causes the operation of the line contactor 6, whereupon contact members 10, 11 and 12 are closed to energize the conductors 14, 15 and 16, to thus energize the armature winding 17 of the synchronous motor 18. Contact members 19 and 24 are also closed by the operation of the line contactor 6. Closure of the contact member 19 merely establishes a shunt circuit with reference to the starting switch 3, so that the line contactor 6 remains in closed circuit position regardless of the position of the starting switch 3 and the deenergization of the line contactor 6 can only be effected through the operation of the stop switch 7.

The closure of the contact members 24 by the line contactor 6, establishes a circuit from the energized conductor 2, through contact members 24, actuating coil 25 of the contactor 26, conductor 27, back contact members 28 of the field contactor 23 and conductor 29 to the energized conductor 8. Energization of the actuating coil 25 causes the operation of the contactor 26 to thus close the contact members 30, 31 and 32, and to thus energize the primary winding 33 of the second motor, namely, the wound rotor induction motor 34. From the circuits hereinbefore discussed, it will be apparent that immediately after the motor 18 has become energized and has begun to rotate, the wound rotor induction motor 34 which is a comparatively small motor and coupled to the synchronous motor 18 to be positively driven thereby, is energized from the same source of alternating-current that is connected to the synchronous motor.

It is not necessary for the operation of my system of control that this motor 34 must necessarily be connected to the same source of alternating-current, but it is important that the source of alternating current supplied to the induction motor 34 have some definite or constant relation as far as the frequency is concerned to the alternating current supplied to the armature winding of the synchronous motor. As long as this relation is maintained and a proper choice of machine 34 is made, it is apparent that the output of the secondary winding 35 of the induction motor 34 during nonsynchronous operation of motor 18 will be inversely proportional to the speed of motor 18 and will be zero at synchronous speed, or in other words, the output of the secondary winding 35 will be a function of the slip speed of the synchronous motor 18 when operating as an induction motor and will have a zero output when motor 18 is operating at synchronous speed.

Immediately upon the connection of the armature winding 17 to the source of alternating current, the motor 18 will begin to rotate but at the instant of its energization an alternating-current will be induced in the field winding which will have a frequency equal to the frequency of the source of alternating-current being supplied to the armature but which frequency will rapidly decrease as the synchronous motor accelerates.

To prevent excessive voltages across adjacent turns of the field winding 20, the field contactor 23 is provided with back contact members 22 adapted to close a discharge circuit for the field winding 20 through the discharge resistor 21.

As the synchronous motor increases its speed, the frequency of the current induced in the secondary winding 35 also decreases. Such being the case, it appears that the secondary currents of the secondary winding 35 may readily be used to control the direct-current energization of the field winding 20. To properly control the synchronization, namely, the excitation of the field winding 20 with direct-current, I have connected the time limit relay designated TL both to the source of direct-current and to the output of the secondary winding 35. I connect a magnetizing coil 38 of the TL relay in circuit relation with the secondary winding 35 through a rectifier 36, an adjustable rheostat 37 and the conductor 39. It will thus be apparent that magnetizing coil 38 will be energized by a direct current. The instant the induction motor 34 is energized from a source of alternating-current and is positively driven, the current in coil 38 will thus be a function of the slip speed of the synchronous motor 18. It is not important that the energization of coil 38 be at all times directly proportional to the slip speed and in practice it is not likely to be thus energized for the higher frequencies induced in the secondary winding 35. As the motor 18 comes up to near its balancing speed, as an induction motor, the frequency of the currents induced in the secondary winding 35 decreases very materially and for such range, the energization of the magnetizing coil 38 becomes a direct function of the slip speed and at the synchronous speed the energization will be zero.

The TL relay is so designed that its coil is so energized that the armature 48 will be released as soon as the motor 18 has accelerated very near to its balancing speed when operating as an induction motor. When near such balancing speed, the neutralizing coil 44 will have a sufficient strength relative to the magnetizing coil 38 to completely dissipate even the residual magnetism in the iron structure of the TL relay, so that armature 48 is released. Since this TL relay is provided with a short circuit winding 46 mounted on the core 48 and adjustable resilient armature biasing means 47, the armature 48 will be released a predetermined interval of time after the energization of coil 38 has decreased to a selected value.

After the lapse of such a predetermined interval of time, the contact members 67 are closed. Closure of these contact members will cause the energization of the actuating coil 65 of the field contactor 23 provided the contact members 69 of the time limit device 58 are at such a time closed. For the normal operation for which my system of control is designed and for the type of application it is well adapted, the time limit device 58 is so adjusted that the contact members 69 will be closed prior to the closure of the contact members 67.

The time limit device 58 has a time constant only in one direction, namely, toward its closing direction and the closure of contact members 24, in addition to establishing a circuit for the contactor 26, also establishes a circuit through actuating coil 57 from energized conductor 2 to contact members 24, coil 57 and thence to energized conductor 29.

When the synchronous motor is unloaded, namely, operates at no load during its accelerating period, it is likely to come to its balancing speed in a much shorter interval of time and its balancing speed may be very much nearer the synchronous speed than would otherwise be the case. In such instance, it might happen that contact members 67 close prior to the closure of contact members 69. From this, it will be apparent that synchronization of the synchronous motor 18 will, for no load operation of the motor, not occur prior to the lapse of a predetermined interval of time, which interval of time will be determined by the time limit relay 58. The more usual and normal operation will, however, be such that contact members 69 close prior to the closure of contact members 67. Assuming that such normal operation obtains, then the closure of contact members 67 establishes a circuit from the bus 41 through conductor 42, actuating coil 65 of the field contactor 23, conductor 66, contact members 56, armature 48, contact members 67 and 60 and conductor 68 to the bus 69. The operation of the time limit device 54 will be discussed hereinafter when discussing resynchronization.

Energization of the actuating coil 65 causes the operation of the field contactor 23 to thus connect the buses 41 and 69 through contact members 70 and 71, directly to the field winding 20, to thus also energize the synchronous motor 18 with direct current. Immediately after the closure of contact members 70 and 71, the back contact members 22 are opened to thus disconnect the field winding 20 from the discharge resistor 21.

Operation of the field contactor 23 also causes the opening of the back contact members 28 and 53. Opening of the back contact members 28 causes deenergization of the induction motor 34, since its energization is no longer necessary, because the motor 18 has been synchronized by the energization of the field winding 20 with direct-current.

Immediately upon the energization of the field winding 20 with direct-current, the power factor of the motor 18 becomes unity or may even become leading, depending upon the field excitation and in consequence the power factor relay 61, having the current coil 62 and the voltage coil 63, operates to close its contact members 64. The actuating coil 65 of the field contactor 23 thus remains energized regardless of the position of the contact members 56.

The time limit device 54 has a relatively short time constant in both directions, which time constant is, however, selected long enough after the energization of the field winding 20 to permit the power factor relay to close its contact members 64 before the contact members 56 are opened, which opening will, of course, be caused by reason of the fact that the actuating coil 50 of the time limit device 54 is deenergized because the back contact members 53 in the circuit of the actuating coil 50 are opened by the operation of the field contactor 23.

In the event of an excessive load occurring on the motor 18, the motor will be pulled out of synchronism. When this occurs, the power factor immediately is very materially changed, and in consequence contact members 64 open. Since contact members 56 are at such time open, the actuating coil 65 of the field contactor 23 is deenergized thus removing the field from its source of direct current and thus preventing undesirable shocks upon the supply for the motor 18. The field contactor 23, when thus deenergized, also reenergizes the induction motor 34 by reason of the closure of contact members 28, and also causes the establishment of a circuit from the bus 41 through conductor 49, actuating coil 50 of the time limit device 54, conductor 52 and back contact members 53 to the bus 69. After a short interval of time, the time limit device 54 will operate to reclose its contact members 56 and the motor will resynchronize provided its slip is low enough to cause the closing of contact members 67 which have been opened, if the energization of the coil 38 was of sufficient magnitude. In any case, resynchronization will be accomplished by my system of control in case of pull-out exactly in the manner that synchronization takes place during a conventional starting cycle. Of course, if the load is not removed and the slip remains high, contact members 67 might not close and then other overload devices constituting no part of my invention disconnect the motor 18 from the line.

It will be noted that the neutralizing coil 44 of the time limit relay TL is connected to the buses 41 and 69 by a circuit through conductor 42, adjustable resistor 43, neutralizing coil 44 and conductor 45 to the bus 69. The adjustable resistor 43 provided an additional means for adjusting the time constant of the TL relay.

I am, of course, aware that others, particularly after having had the benefit of the teachings of my invention, might devise other circuit diagrams and starting control systems for alternating-current motors that may accomplish substantially the results my invention accomplishes, but I do not wish to be limited to the particular showing made in the drawing nor the specific application hereinbefore discussed, but wish to be limited only by the scope of the appended claims and such prior art as may be pertinent. In this connection, it should be apparent to those skilled in the art that my system of control is not limited to controlling the synchronization of the synchronous motor, but is readily adaptable to controlling both the speed and torque of an induction motor.

I claim as my invention:

1. In a system of control for starting an electric motor, in combination, a source of alternating-current, an alternating-current motor having a primary winding and a secondary winding, means for connecting the primary winding to the source of alternating current to accelerate the motor, a source of direct current, means for connecting the secondary winding to the source of direct current, current generating means electrically separate and distinct from said motor but mechanically coupled to said motor, adapted to generate unidirectional current impulses having a frequency proportional to the slip of the motor, and means responsive to said current impulses adapted to cause the operation of the means for connecting the secondary winding to said source of direct current.

2. In a system of control for starting an electric motor, in combination, a synchronous motor having an armature winding and a field winding, a source of alternating current, means for connecting the armature winding to the source of alternating current, a source of direct current, electromagnetic means adapted to connect the field winding to the source of direct current, and relatively small dynamo-electric means, having a primary winding connected to the source of alternating current and a secondary winding connected to energize the said electromagnetic means, coupled to the synchronous motor to be driven thereby.

3. In a system of control, in combination, a source of alternating current of a given frequency, a wound rotor induction motor, having a primary winding connected to said source of alternating current and having a secondary winding, means for positively driving the secondary winding at such a speed with reference to the frequency of the currents of the said source of alternating current that the frequency of the current produced in the secondary winding is low relative to the frequency of the current in the source of alternating current, a rectifier connected in circuit with the secondary winding, a solenoid, a source of direct current energy, and means responsive to the rectified current in the circuit of the secondary winding adapted to connect said solenoid to said source of direct current.

4. A starting control system for a synchronous motor, in combination, means for starting the motor as an induction motor, an induction type alternating current generator coupled to the synchronous motor and energized by an alternating current of constant frequency whereby the frequency of the current generated by the generator will have a definite relation to the slip speed of the synchronous motor, and means responsive to a current of a given frequency generated by the generator adapted to synchronize the synchronous motor.

5. A starting control system for a synchronous motor, in combination; means for accelerating the synchronous motor, operating as an induction motor, to a certain balancing speed; generator means electrically separate and distinct from said synchronous motor but mechanically coupled to the motor adapted to generate a current that varies as a direct function of the slip speed of the motor and which means thus generate substantially zero current at zero slip speed; and means responsive to the current generated by said generator means, when the synchronous motor slip speed is relatively low, adapted to transfer the said synchronous motor from induction motor operation to synchronous motor operation.

6. In a control system for starting a synchronous motor, in combination; a synchronous motor having conventional field windings thereon; a source of alternating current; a relay having a magnetizing coil; a transformer having a primary winding and a secondary winding adapted to have its primary winding energized from said source of alternating current, the secondary winding being coupled to the rotating element of the motor whereby the output of the secondary winding decreases, during acceleration of the motor, with the slip; a rectifier; circuit means interconnecting the secondary winding, the rectifier and the magnetizing coil of said relay; a neutralizing coil on the relay adapted to demagnetize said relay at a predetermined slip of the motor; a source of direct current; and means responsive to the demagnetization of said relay adapted to connect the field windings of the motor to said source of direct current.

7. In a control system for starting and synchronizing a synchronous motor, the combination of, a motor and means responsive to a predetermined departure of the motor speed from a given speed of the motor, said means including a wound rotor induction motor having a primary winding energized with alternating currents of a constant frequency and having a secondary winding, said induction-motor secondary winding being driven by the synchronous motor so that the output of this said secondary winding changes proportional to a departure of the synchronous motor from a given speed, a relay, connected in the secondary winding of the wound rotor induction motor, adapted to become deenergized when the speed of the synchronous motor differs by a small value from the given speed, and means responsive to the said relay, adapted to synchronize the synchronous motor.

8. In a control system for starting and synchronizing a synchronous motor the combination of a motor and means responsive to a predetermined departure of the motor speed from a given speed of the motor, said means including a wound rotor induction motor having a primary winding energized with an alternating current of constant frequency and having a secondary winding, said secondary winding being driven by the synchronous motor so that the output of this said secondary winding is proportional to a departure of the synchronous motor from a given speed, a relay, connected in the secondary winding of said induction motor, adapted to become deenergized when the speed of the synchronous motor differs from the given speed, said relay including time limit means whereby it may be caused to operate a definite time after the synchronous motor speed has attained a speed having a given value with reference to said given speed.

9. In a control system for starting and synchronizing a synchronous motor the combination of a motor and means responsive to a predetermined departure of the motor speed from a given speed of the motor, said means including a wound rotor induction motor having a primary winding energized with an alternating current of a constant frequency and having a secondary winding driven by the synchronous motor so that the output of this said secondary winding is proportional to a departure of the synchronous motor from a given speed, a relay, connected in the secondary winding of the wound rotor induction motor, adapted to become deenergized when the speed of the synchronous motor differs from the given speed, said relay including time limit means whereby it may be caused to operate a definite time after the synchronous motor speed has attained a speed having a given value with reference to said given speed, and means, responsive to the said relay, adapted to synchronize the synchronous motor.

10. In a control system for controlling the starting sequence of an alternating current motor, in combination, a motor having primary and secondary windings, a second and smaller alternating-current motor having primary and secondary windings coupled to said first motor to be driven thereby, means for energizing the primary windings of said motors with alternating currents having a fixed frequency relation to each other, whereby the output of the secondary winding of the second motor is a measure of the slip of the first motor, and means, responsive to the output of the secondary winding of the second motor, adapted to control the circuit connections of the secondary winding of the first motor.

11. In a control system for controlling the starting sequence of an alternating current motor, in combination, a motor having primary and secondary windings, a second and smaller alternating-current motor having primary and secondary windings coupled to said first motor to be driven thereby, means for energizing the primary windings of said motors with alternating currents having a fixed frequency relation to each other, whereby the output of the secondary winding of the second motor is a measure of the slip of the first motor, time limit means connected in circuit relation with the secondary winding of the second motor, and means, responsive to said time limit means, adapted to control the circuit connections of the secondary winding of the first motor.

12. In a control system for controlling the starting sequence of an alternating-current motor, in combination, a motor having primary and secondary windings, a second and smaller alternating-current motor having primary and secondary windings coupled to said first motor to be driven thereby, means for energizing the primary windings of said motors with alternating currents having a fixed frequency relation to each other, whereby the output of the secondary winding of the second motor is a measure of the slip of the first motor, a rectifier connected in the output circuit of the secondary winding of the second motor, a relay connected to be responsive to the output of the rectifier, and means responsive to an operation of said relay adapted to control the circuit connections of the secondary winding of the first motor.

13. In a control system for controlling the starting sequence of an alternating-current motor, in combination, a motor having primary and secondary windings, a second and smaller alternating-current motor having primary and secondary windings coupled to said first motor to be driven thereby, means for energizing the primary windings of said motors with alternating currents having a fixed frequency relation to each other, whereby the output of the secondary winding of the second motor is a measure of the slip of the first motor, a rectifier connected in the output circuit of the secondary winding of the second motor, a relay including adjustable time limit means connected to be responsive to the direct-current output of said rectifier, and means, responsive to an operation of said relay, adapted to control the circuit connections of the secondary winding of the first motor.

14. In a control system for controlling the starting sequence of an alternating-current motor, in combination, a motor having primary and secondary windings, a second and smaller alternating-current motor having primary and secondary windings coupled to said first motor to be driven thereby, means for energizing the primary windings of said motors with alternating currents having a fixed frequency relation to each other, whereby the output of the secondary winding of the second motor is a measure of the slip of the first motor, a rectifier connected in the output circuit of the secondary winding of the second motor, a relay including adjustable time limit means connected to be responsive to the direct-current output of said rectifier, a source of direct-current, and means, responsive to the operation of said relay, adapted to connect the secondary winding of said first motor to said source of direct-current.

15. In a control system for controlling the starting sequence of an alternating-current motor, in combination, a motor having primary and secondary windings, a second and smaller alternating-current motor having primary and secondary windings coupled to said first motor to be driven thereby, means for energizing the primary windings of said motors with alternating currents having a fixed frequency relation to each other, whereby the output of the secondary winding of the second motor is a measure of the slip of the first motor, a rectifier connected in the output circuit of the secondary winding of the second motor, a relay connected to be responsive to the output of the rectifier, means responsive to an operation of said relay adapted to control the circuit connections of the secondary winding of the first motor, and means adapted to make any operation of said relay ineffective for a predetermined interval of time after the primary winding of said first motor is energized from its source of alternating current.

16. In a control system for controlling the starting and synchronizing of a synchronous motor and the resynchronizing of a synchronous motor in case of pullout, in combination, a synchronous motor having an armature winding and a field winding, an alternating-current motor having a primary winding and a secondary winding coupled to said synchronous motor to be driven thereby, means for energizing the armature winding of the synchronous motor and the primary winding of the second alternating-current motor with an alternating-current, whereby the output of the secondary winding of the second alternating-current motor is a measure of the slip of the synchronous motor, and means, responsive to the output of the secondary winding of the second alternating-current motor, adapted to energize the field winding of the synchronous motor with direct current.

17. In a control system for controlling the starting and synchronizing of a synchronous motor and the resynchronizing of a synchronous motor in case of pull-out, in combination, a synchronous motor having an armature winding and a field winding, an alternating-current motor having a primary winding and a secondary winding coupled to said synchronous motor to be driven thereby, means for energizing the armature winding of the synchronous motor and the primary winding of the second alternating-current motor with an alternating-current, whereby the output of the secondary winding of the second alternating-current motor is a measure of the slip of the synchronous motor, time limit means connected in circuit with the secondary winding of the driven alternating-current motor, and means, responsive to said time limit means, adapted to energize the field winding of the synchronous motor with direct-current.

18. In a control system for controlling the starting and synchronizing of a synchronous motor and the resynchronizing of a synchronous motor in case of pull-out, in combination, a synchronous motor having an armature winding and a field winding, an alternating-current motor having a primary winding and a secondary winding coupled to said synchronous motor to be driven thereby, means for energizing the armature winding of the synchronous motor and the primary winding of the second alternating-current motor with an alternating current, whereby the output of the secondary winding of the second alternating-current motor is a measure of the slip of the synchronous motor, a rectifier connected in the output circuit of the secondary winding of the driven motor, a relay connected to be responsive to the direct-current output of the rectifier, and means responsive to a certain operation of said relay adapted to effect the energization of the field winding of the synchronous motor with direct-current.

19. In a control system for controlling the starting and synchronizing of a synchronous motor and the resynchronizing of a synchronous motor in case of pull-out, in combination, a synchronous motor having an armature winding and a field winding, an alternating-current motor having a primary winding and a secondary winding coupled to said synchronous motor to be driven thereby, means for energizing the armature winding of the synchronous motor and the primary winding of the second alternating-current motor with an alternating current, whereby the output of the secondary winding of the second alternating-current motor is a measure of the slip of the synchronous motor, a rectifier connected in the output circuit of the secondary winding of the driven motor, a relay including adjustable time limit means connected to be responsive to the direct-current output of said rectifier, and means, responsive to a certain operation of said relay, adapted to energize the field winding of the synchronous motor with direct current.

RALPH H. WRIGHT.